United States Patent Office 3,012,485
Patented Dec. 12, 1961

3,012,485
BITUMINOUS COMPOSITIONS
Theodore F. Bradley, Orinda, Calif., assignor to Shell
Oil Company, a corporation of Delaware
No Drawing. Filed Mar. 30, 1959, Ser. No. 802,653
20 Claims. (Cl. 94—22)

This invention relates to new bituminous compositions. More particularly, the invention relates to new bituminous compositions containing special reactive components which are particularly useful for preparing roadways and walkways and/or surfacing of already prepared roadways and walkways.

Specifically, the invention provides new and particularly useful compositions comprising (1) a bituminous material, such as, for example, paving grade asphalt, (2) a polyepoxide having more than one vic-epoxy group, and preferably a liquid polyglycidyl ether of a polyhydric phenol, and (3) a polycarboxylic acid comprising a partial ester of (a) a polyhydroxy-containing compound and (b) an adduct of an ethylenically unsaturated compound, and preferably an unsaturated fatty acid, and a butenedioic acid anhydride, such as maleic anhydride. As a special embodiment, the invention provides a method for utilizing the above-described compositions in the construction of roadways, airfields, walkways and the like, as well as the use of the compositions in the surfacing of already constructed roadways and walkways, particularly to impart skid resistance.

There is a growing need for better materials for use in construction of roadways, airfields and the like. Such materials, for example, should have better wear resistance, better solvent and heat resistance (as in the case of asphalt roads) and better resistance to skidding. There is also a need for an economical surfacing composition that can be applied to already formed concrete and asphalt road or storage areas to help reduce the destruction of the surface due to wear, rain, deicing salts and cracking due to brittleness in cold weather. In the case of asphalt surfaces, there is also a need for coatings that would improve resistance to heat and solvents. This is particularly urgent in the case of maintenance areas, warm-up pads and asphalt runways for jet aircraft as the heat and jet fuels readily attack asphalt surfaces. Further, concrete and asphalt road surfaces and exposed metal on bridge roadways, etc. tend to develop smooth surfaces due to wear which cause skidding when wet and there is a great need for a non-skid coating that will adhere to these surfaces.

Various compositions have been suggested for the above purposes, but the compositions suggested heretofore have not proved very satisfactory. In most cases, the new compositions fail to have any improved wearability, solvent resistance or skid resistance. When applied as a coating over already prepared concrete and asphalt roadways, they fail to have the necessary adhesion, particularly if the surfaces are the least oily or dirty. In other cases, the coatings fail to stand up under inclement weather conditions. In still other cases, the coatings are too brittle for use on large areas. In still other cases, the coatings are too expensive or too difficult to apply.

It is an object of the invention, therefore, to provide new compositions which are suitable for use in the construction of new roadways, airfields, walkways and the like. It is a further object to provide new compositions which may be used to prepare roadways which have better wearability, solvent resistance and skid resistance. It is a further object to provide new compositions which are useful as coatings for concrete, asphalt, wood and metal surfaces. It is a further object to provide new compositions which form coatings for concrete, asphalt, wood and metal having excellent resistance to wear, rain and cold weather. It is a further object to provide new surfacing compositions which form films having good resistance to solvents, heat, and deicing salts. It is a further object to provide new surfacing compositions which have good flexibility. It is a further object to provide new surfacing compositions which have good skid resistance. It is a further object to provide new coatings which are relatively inexpensive and can be easily applied to new and old surfaces and surfaces which have large area. Other objects and advantages of the invention will be apparent from the following detailed description thereof.

It has now been discovered that these and other objects may be accomplished by the compositions of the invention comprising (1) a bituminous material, such as, for example, paving grade asphalt, (2) a polyepoxide having more than one vic-epoxy group, and preferably a liquid polyglycidyl ether of a polyhydric phenol, and (3) a polycarboxylic acid comprising a partial ester of (a) a polyhydroxy-containing compound and (b) an adduct of an ethylenically unsaturated compound, and preferably an unsaturated fatty acid, and a butenedioic acid anhydride, such as maleic anhydride. It has now been unexpectedly found that the above-described compositions are excellent binders for aggregate and in combination therewith form compositions which can be used to form superior roadways, airfields, walkways and the like. The roadways, etc. prepared from these special compositions have excellent wearability, excellent heat resistance and solvent resistance and good skid resistance. In addition, it has been found that the above-described compositions can be used as surfacing compositions for already formed roadways, airfields, walkways and the like, and particularly those prepared from cement, asphalt, wood, metal and the like. They have excellent adhesion to such surfaces and can be secured in combination therewith to form tough flexible coatings. The resulting surfaces also have surprising resistance to solvents, such as gasoline, jet fuels and the like, and have good heat resistance, i.e., do not soften or run when exposed to high temperatures. In addition, the wear resistance and resistance to weather are outstanding for such coatings.

When small inert particles are added to the compositions before or during cure, the cured coatings have excellent resistance to skidding. The coatings are particularly attractive for use on highways and runways, as they can be easily applied to large areas and set up quickly without the use of any special curing conditions.

These compositions have been found to be useful not only for the treatment of roadways and airfields, but are equally valuable for the treatment of dock areas, warehouse floors, sidewalks, tennis courts, ship decks, and the like where wear and weather resistant properties are desired.

It was quite unexpected to find that the new compositions have such superior properties. It had been found heretofore, for example, that certain bituminous materials, such as straight run asphalts, were incompatible with polyepoxides, such as the glycidyl polyethers of polyhydric phenols. Further, it was unexpected to find that the coatings were highly flexible and heat resistant as it is known that bituminous materials generally form brittle coatings which soften on heating. The polyepoxides also form relatively brittle coatings in comparison with those of the compositions described.

The bituminous materials used in the compositions of the present invention include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked and catalytically or non-catalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cp. at 100° F. to about 1500 cp. at 100° F.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° C. and solubility in carbon disulfide of at least 75% with a specific gravity of 1.10 and 1.50, and low melting coal tar pitches having a fusing point below 120° F. and a solubility in carbon disulfide of at least 75%.

The polyepoxides to be used in preparing the compositions of the present invention comprise those materials possessing more than one vicinal epoxy group, i.e., more than one

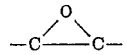

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl), 1,2,4 - butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl, 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate, dibutyl 7,8,11,12-diepoxyoctadecanedioate, dioctyl 10,11-diethyl-8,9,12,13-diepoxy-eiconsanedioate, dihexyl 6,7,10,11-diepoxyhexadecanedioate, didecyl 9-epoxy-ethyl-10,11-epoxyoctadecenedioate, dibutyl 3-butyl-3,4,5,6-diepoxycyclohexane-1,2 - dicarboxylate, dicyclohexyl 3,4,5,6 - diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl) pentane (epoxy value 0.514 eq./100 g.) and the like and mixtures thereof.

The polycarboxylic acids employed in the compositions of the invention comprise the partial esters of a polyhydroxy-containing compound and an adduct of an ethylenically unsaturated compound, and preferably an unsaturated fatty acid, and a butenedioic acid anhydride, such as maleic anhydride. The adducts of the ethylenically unsaturated compound and the acid anhydride will contain in addition to any functional group on the unsaturated backbone compound, a free cyclic anhydride group. When combined with the polyhydroxy-containing compound, one molecule of the adducts reacts with the said polyhydroxy compound through the anhydride group to form a carboxyl and ester group and another molecule of the adducts reacts in the same manner. The partial esters then may be represented by the following general formula

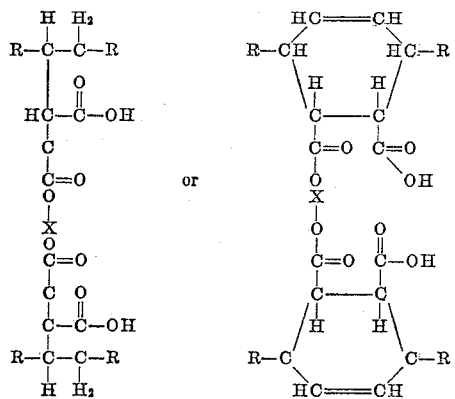

(in the case of conjugated diene compounds) wherein X is the portion of the polyhydroxy compound after removing the two OH groups and the R radicals are the remaining portion of the unsaturated compound used in making the adduct with the butenedioic acid.

The adducts used in making the polycarboxylic acids are obtained by merely heating an approximately equivalent proportion of the ethylenically unsaturated compound and the butenedioic acids together say at 400° F. to about 500° F. for a few hours. The ethylenically unsaturated material used in making these adducts are preferably those containing a plurality of ethylenic groups which may be conjugated or non-conjugated and those which contain at least 10 carbon atoms and have a functional group, preferably a free carboxyl or ester group. Examples of these ethylenically unsaturated compounds include, among others, unsaturated fatty acids as linseed oil fatty acids, soya oil fatty acids, dehydrated castor oil fatty acids, china-wood oil fatty acids, linolenic acids and other similar unsaturated fatty acids as well as rosin acids and mixtures of rosin acids and fatty acids, such as are present in tall oil, alkyl esters of these unsaturated fatty acids, as well as the glycerol esters of the acids, ethylenically unsaturated hydrocarbons, such as octadecene, octadecadiene, nonadecadiene, tetradecadiene, their halogenated derivatives as well as alkoxy and sulfur-containing derivatives. Particularly preferred unsaturated compounds to be used in making the derivatives include the ethylenically unsaturated aliphatic hydrocarbons, the unsaturated fatty acids and their alkyl esters all of which contain at least 10 carbon atoms and preferably 16 to 32 carbon atoms.

The butenedioic acid anhydrides employed in preparing the adducts are preferably the maleic acid anhydrides, such as maleic anhydride, chloromaleic anhydride and dimethylmaleic anhydride.

As noted above, these adducts may be prepared by simply heating the two components together in approximately equivalent proportions, such as one mole of the ethylenically unsaturated compound with one mole of the butenedioic acid anhydride. Temperatures employed preferably range from about 400° F. to about 500° F., but higher or lower temperatures may be employed as needed. Time of heating generally varies between about .5 to 7 hours.

The polyhydroxy-containing material used in the esterification of the above-described adducts to form the desired polycarboxylic acids may be any material having two esterifiable OH groups which are separated by two and preferably 4 carbon atoms. Examples of these include, among others, the aliphatic and cycloaliphatic polyhydric alcohols, such as ethylene glycol, diethylene glycol, tetraethylene glycol, propylene glycol, dipropylene glycol, butylene glycol, dibutylene glycol, glycerol, hexanetriol, pentaerythritol, 1,4-dihydroxycyclohexane, glycerol monoacetate, glycerol monostearate, monoallyl ether of glycerol, thiodipropanol, thiodibutanol, sulfonyl dipropanol, and polyols obtained by reacting dihydric phenols with epichlorohydrin and ethylene chlorohydrin as in U.S. 2,558,949.

Particularly preferred polyhydroxy-containing compounds to be used in making the partial esters include the alkylene glycols and the long chain polyhydric alcohols obtained by reacting polyhydric alcohols with alkylene oxides, such as ethylene oxide, propylene oxide, butylene oxide and the like, and the partial esters or ethers of polyhydric alcohols containing more than 2 OH groups, such as the partial monocarboxylic acid and monoalkanol esters and ethers of glycerol, hexanetriol and the like. These preferred polyhydroxy-containing compounds preferably contain at least 2 and preferably at least 4 carbon atoms and have a molecular weight that may go as high or higher than 2000 as in the case of the alkylene oxide adducts.

The partial ester may be prepared by simply heating the adduct and the polyhydroxy-containing compounds in equivalent proportions, i.e., sufficient amount to furnish one cyclic anhydride group per OH group to be esterified. Thus, to form a partial ester of a maleic anhydride-linoleic acid adduct with diethylene glycol, one should react two moles of the adduct with one mole of the diethylene glycol. Temperatures employed in the reaction may vary depending upon the nature of the reactants, but in most cases temperatures will range from about 300° F. to about 500° F. Solvents, such as inert hydrocarbons as benzene, xylene, toluene and the like, may be used to facilitate the reaction, and in the case of formation of water, to assist in the removal of the water by azeotropic distillation.

The partial esters formed by the above-described process will vary from viscous liquids to soft to hard solids. They will possess at least two free carboxyl groups, and when the unsaturated fatty acids are used as the material to be condensed with the butenedioic acid anhydrides, the resulting products will possess at least 4 carboxyl groups.

When the compositions are to be used in the construction of maintenance areas and warm-up strips for jet aircraft, it is highly desirable to employ as partial esters those obtained by the use of adducts obtained from unsaturated fatty acids, i.e., partial esters containing at least 4 free carboxyl groups.

The preparation and some of the properties of the partial esters used in preparing the compositions of the invention are illustrated below:

PARTIAL ESTER OF MALEIC ANHYDRIDE-LINOLEIC ACID ADDUCT AND DIETHYLENE GLYCOL 840 parts (3 mols) of linoleic acid and 294 parts (3 mols) maleic anhydride are placed in a glass reaction vessel and heated for 1.5 hours at 180° C. with stirring. The mixture was then heated for 5 hours at 195° C. All heating was done in the presence of nitrogen.

378 parts of the adduct prepared above was combined with 53 parts of diethylene glycol in a glass reactor and the mixture heated for 1 hour at 160–170° C. with stirring. The resulting product was a viscous liquid having an ester value of 0.270 eq./100 g. and an acidity of 0.331 eq./100 g.

PARTIAL ESTER OF MALEIC ANHYDRIDE-LINOLEIC ACID ADDUCT AND POLYPROPYLENE GLYCOL 189 parts of the linoleic acid-maleic anhydride adduct prepared as above and 106 parts of polypropylene glycol having a molecular weight of 425 are combined in a glass reaction vessel and heated for 1 hour at 170–185° C. The resulting product was a viscous liquid having an ester value of 0.150 eq./100 g. and acidity of 0.183 eq./100 g.

PARTIAL ESTER OF MALEIC ANHYDRIDE-LINOLEIC ACID ADDUCT AND POLYETHYLENE GLYCOL 189 parts of the linoleic acid-maleic anhydride adduct prepared as above was combined with 50 parts of polyethylene glycol having a molecular weight of 200 in a glass reactor and the mixture heated with stirring at a temperature of 180° C. for 1.5 hours. The resulting product was a viscous liquid having an ester value of 0.105 eq./100 g. and an acidity of 0.418 eq./100 g.

PARTIAL ESTER OF ROSIN ACID-MALEIC ANHYDRIDE ADDUCT AND POLYBUTYLENE GLYCOL

Equimolar quantities of rosin (350 parts) and maleic anhydride (98 parts) were heated to 525° F. for 30 minutes to give a hard brittle product having an acid value of 333 and a weight per carboxyl group of of 168.

179.2 parts of the above adduct was combined with 12.4 parts of ethylene glycol and the mixture heated to 500° F. for 30 minutes with xylene reflux. The product when cool was a solid having an acid number of 183.

PARTIAL ESTER OF METHYL LINOLEATE-MALEIC ANHYDRIDE ADDUCT AND PROPYLENE GYLCOL

Equimolar quantities of methyl linoleate and maleic anhydride were heated at 180° C. for 1.5 hours in a glass reaction vessel.

392 parts of the above-described adduct was combined with 38 parts of propylene glycol and the mixture heated for 1 hour at 160–170° C. with stirring. The resulting product was a viscous liquid having an acidity of .48 eq./100 g.

The compositions of the invention may be prepared by a variety of different methods. When the compositions are to be utilized as surfacing compositions which may be cured at elevated temperatures, it is generally preferred to mix the hot bituminous material with the polycarboxylic acid and then combine this hot mixture with the polyepoxide just before application. If the compositions are to be used in combination with aggregate, cold or hot aggregate may be added before application.

It is also possible to combine all three ingredients together at the same time, preferably in a heated condition, mixing (with aggregate and catalyst as desired) and then shortly applying the mixture to the desired surface. This type of operation appears to be desirable for coating of large highway or airfield areas.

It is also possible to combine the three components together without the use of heat, but this makes mixing and handling sometimes difficult.

If the compositions of the invention are to be used for certain applications, such as in the laminating of paper, or in applications where a high initial viscosity is desired and in which the cure is to be completed at lower temperatures such as near room temperature, it is sometimes desirable in the mixing to first combine the partial ester and polyepoxide together while hot to effect precondensation and then add the bituminous material and other desired additives, such as, for example, aggregate and the like. Some or all of the bituminous material may also be present during this precondensing period.

The proportions of the three components to be utilized in the above methods of preparation may vary within certain limits. The polyepoxide and the partial ester are preferably combined in approximately chemical equivalent amounts, i.e., an amount sufficient to furnish one epoxy group for every carboxyl group. Up to about 30% excess of either reactant may be employed.

The amount of the reactive components, i.e., the polyepoxide and the partial esters to be employed in relation to the amount of the bituminous material will preferably vary from about 0.5% to about 85% by weight, the proportion being governed by the intended use of the final product. For example, if a substantially infusible composition is desired, the proportion of the polyepoxide and partial ester should be in excess of about 15%, and preferably 20% to 50%. If, on the other hand, it is desired only to increase the softening point moderately or to decrease the penetration of an asphalt to a limited extent, the presence of from 0.5% to 10% by weight of the polyepoxide and partial ester shows a striking response with respect to both properties. The normal amounts of these components to be used in relation to the bituminous material will preferably vary from about 20% to about 65%.

As noted, it is preferred to employ heat during the mixing of the components. Preferred temperatures range from about 200° F. to about 400° F., and more preferably from about 250° F. to 350° F. The heat may be applied by first preheating one or more of the ingredients, such as the asphalt and polymerized acid, or by heating the mixture of the two or three components together.

In the case where precondensation of the polyepoxide and partial ester is desired, the heating of the mixture should be extended to effect the necessary precondensation. The exact time selected will depend, in large part, upon the temperature employed.

An especially preferred type of composition covered by the present invention includes those wherein aggregate, sand, etc. are added before, during or after the preparation of the compositions. If the compositions are to be used as binders for aggregate in construction of new roadways, airfields and walkways, as noted hereinbefore, the aggregate (e.g., crushed rock, quartz, shells, aluminum oxide particles, etc.) may be added.

If the compositions are to be used as surfacing compositions to form skid resistant coatings, the aggregate may also be added before, after or during the preparing. In this case, the aggregate, sand, etc. is preferably added after the coating has been spread. It is also desirable, in some cases, to add a part of the particles during the preparation, and then spread addition particles on the coating after it has been applied to the surface. In the case of coating highways and walkways, it is generally preferred to apply the inert particles after the composition has been spread on the road or walkway. Excess particles may be removed after cure has taken place.

The inert particles or aggregate should preferably be rather small and preferably have a mesh size varying from about 4 to 300. Preferred materials include sand, crushed rocks, finely divided shells, crushed quartz, aluminum oxide, finely divided resinous particles, and the like. Particularly preferred are the minerals, and especially the siliceous materials, such as, for example, sand and crushed rock. Mixtures of various types of particles may also be used.

When used to prepare roadways etc., it is generally preferred to add the hot aggregate to the mixture of components and mix all together in a cement or other type of mixer and then apply this mixture to the prepared roadway bed. Roadways prepared in this manner containing large rocks are useful as warning or "rumble" strips for highways.

The compositions of the invention may be cured to form the desired product by application of heat. Temperatures used in such cure generally range from about 100° C. to about 250° C. This heat may be applied by the addition of the above components in a preheated condition, by the adding of heated mineral aggregate to the mixture of components or by spreading of heated inert particles or aggregate on the compositions after being spread. The heat may also be applied externally by means of electrical or other types of heaters, infrared lamps, etc.

The compositions of the invention may be utilized for a great variety of different applications. As noted, they can be used as binders in the construction of roads. In this case, the mixtures can be applied in rather thick layers, such as, for example, 1 to 6 inch layers. Conventional paving equipment may be used in this application.

They are also particularly suited for use as surfacing compositions for various materials, such as cement, asphalt, wood and steel. The cement may be of any of the usual types, such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface may be accomplished in any suitable manner. If the material is thick or contains large amounts of inert particles, the material may best be applied by use of screeds, trowels, shovels or brooms. If it is of a more fluid nature, it may generally be applied by brushing or spraying. The coatings may generally vary in thickness from about $\frac{1}{16}$ to about ¼ inch.

The compositions are also useful as coatings for pipes, off-shore drilling rigs and the like.

The compositions may also be used to make pottings and castings, gasket sealing compositions, roofing compositions and in laminating paper and the like.

The following examples illustrate the present invention. Unless otherwise specified, parts disclosed in the examples are parts by weight. Polyepoxides referred to in the examples by letters are those described in U.S. 2,633,458. The concrete used in the examples was prepared from Portland cement, aggregate, sand and water. The asphalt roadbeds were prepared from straight run paving grade asphalts and aggregate.

*Example I*

This example illustrates the preparation of a composition comprising polyether A, a partial ester of diethylene glycol and an adduct of maleic anhydride and linoleic acid and paving grade asphalt.

62.5% by weight of paving grade asphalt was heated to 300° F. and then mixed with 18.5% by weight of polyether A and 18.5% by weight of the partial ester of diethylene glycol and an adduct of maleic anhydride and linoleic acid prepared as described above. The mixture cured at 125° C. to form a hard tough but flexible composition.

In a related experiment, the above mixture is applied as a coating of about $\frac{1}{16}$ inch thickness to cement concrete roadways. Sand is sprinkled on the top and the sand compacted by means of rollers. In a short while, the coating sets up to form a hard solvent and skid resistant coating.

In a further experiment, the above-described composition comprising the paving grade asphalt, polyether A and partial ester was combined with an equal weight of hot aggregate and the combined mixture spread out on a prepared roadbed and compacted with rollers. The composition set up to form a hard tough solvent resistant road surface. The surface differed from conventional asphalt roadways in that it did not soften on heating, was not distorted on application of pressure and did not soften when contacted with jet fuels and gasoline.

*Example II*

This example illustrates the preparation of a composition comprising polyether A, a partial ester of dimer glycol and an adduct of maleic anhydride and linoleic acid and paving grade asphalt.

62.5% by weight of paving grade asphalt was heated to 300° F. and then mixed with 13.1% by weight of polyether A and 23.7% by weight of the partial ester of dimer glycol (dimer of linoleyl alcohol) and an adduct of maleic anhydride and linoleic acid having an ester value of 0.200 eq./100 g. and an acidity of 0.199 eq./100 g. This mixture was cured at 125° C. to form a hard tough but flexible composition.

In a related experiment, the above mixture was spread on cement concrete to form a coating of about $\frac{1}{16}$ inch thickness. Sand was sprinkled on the top compacted by rolling. In a short while, the coating set up to form a hard solvent and skid resistant coating.

In a further experiment, the above-described mixture was combined with an equal weight of hot aggregate and the combined mixture applied to a prepared roadbed. The composition was then compacted with rollers and allowed to set hard. The mixture set up to form a tough solvent resistant and heat resistant roadway. The composition was of particular value in the preparation of jet aircraft maintenance areas because of its excellent solvent and heat resistance.

*Example III*

67.5% by weight of paving grade asphalt was heated to 300° F. and then mixed with 10% by weight of polyether A and 27.5% by weight of a partial ester of polypropylene glycol having a mol weight of 425 and an adduct of linoleic acid and maleic anhydride prepared as shown above. The mixture cured at 125° C. to form a hard tough but flexible composition.

In a related experiment, the above mixture was spread on cement concrete to form a coating of about $\frac{1}{16}$ inch thickness. Sand was sprinkled on the top and the sand compacted by rolling. In a short while, the coating set up to form a hard solvent and skid resistant coating.

In a further experiment, the above-described mixture was combined with an equal weight of hot aggregate and the combined mixture applied to a prepared roadbed. The composition was then compacted with a roller and allowed to set hard. The mixture set up to form a tough solvent resistant and heat resistant roadway. The composition is of particular value in jet aircraft maintenance areas as it is resistant to jet fuels and did not soften at high temperatures.

*Example IV*

Example III is repeated with the exception that the partial ester is replaced with a partial ester of polyethylene glycol and an adduct of maleic anhydride and linoleic acid prepared as described above. Castings, coatings and roadways are obtained having properties similar to those products shown in Example III.

*Example V*

Example III is repeated with the exception that the partial ester is replaced with a partial ester of polybutylene glycol and an adduct of rosin acid and maleic anhydride prepared as shown above. Castings, coatings and roadways are obtained having properties similar to those products shown in Example III.

*Example VI*

Example III is repeated with the exception that the partial ester is replaced with a partial ester of hexylene glycol and an adduct of linoleic acid and maleic anhydride, the partial ester having an acidity of 0.459 eq./100 g. and an ester value of 0.115 eq./100 g. Castings, coatings and roadways are obtained having properties similar to those products shown in Example III.

*Example VII*

Example III is repeated with the exception that the partial ester is replaced with a partial ester of polybutylene glycol having a mol weight of 500 and an adduct of linoleic acid and maleic anhydride, the partial ester having an acidity of 0.228 eq./100 g. and an ester value of 0.15 eq./100 g. Castings, coatings and roadways having properties similar to those shown in Example III are obtained.

*Example VIII*

67.5% by weight of paving grade asphalt was heated to 300° F. and then mixed with 18.5% by weight of epoxidized tetrahydrobenzyl tetrahydrobenzoate and 18.5% by weight of a partial ester of polypropylene glycol 425 and an adduct of linoleic acid and maleic anhydride as described in Example I. The mixture was stirred and heated to 125° C. for several hours. The resulting product was a hard tough flexible casting.

*Example IX*

Example VIII is repeated with the exception that the epoxidized product is replaced with each of the following: epoxidized diallyl eicosadienedioate, epoxidized dimethallyl phthalate, epoxidized dimethallyl adipate, epoxidized di(tetrahydrobenzyl) ether of ethylene glycol and epoxidized polybutadiene. Related results are obtained in each case.

*Example X*

Examples I to VIII are repeated with the exception that the asphalt is replaced with each of the following: bottoms obtained from the distillation of a catalytically cracked gas oil (Dutrex 20), i.e., extract of petroleum distillate having the following properties: Graviety, °API 5.8; flash, coc. 415° F.; viscosity, SSU at 210° F., 9611; a high boiling fraction of coking cycle stock (coking a Mid-Continent vacuum flasher bottoms) having a viscosity SSU at 77° F. of 5000 and initial boiling point of 658° F., molecular weight about 250; and industrial residual fuel oil. Related results are obtained in each case.

I claim as my invention:

1. A composition comprising (1) a polyepoxide having more than one vic-epoxy group, (2) a bituminous material, and (3) a polycarboxylic acid comprising a partial ester of a polyhydroxy-containing compound of the group consisting of aliphatic and cycloaliphatic polyhydric alcohols and an adduct of an ethyienically unsaturated compound of the group consisting of ethylenically unsaturated aliphatic hydrocarbons, ethylenically unsaturated fatty acids and their alkyl esters, each member of said group containing at least 10 carbon atoms, and a butenedioic acid anhydride.

2. A composition comprising (1) a polyepoxide having more than one vic-epoxy group, (2) an asphalt, and (3) a polycarboxylic acid comprising a partial ester of an aliphatic polyhydric alcohol and an adduct of an unsaturated long chain fatty acid and maleic anhydride.

3. A composition comprising (1) a polyepoxide having more than one vic-epoxy group, (2) a bituminous material, and (3) a polycarboxylic acid containing from 2 to 6 carboxyl groups and comprising a partial ester of an aliphatic polyhydric alcohol and an adduct of an unsaturated acid and maleic anhydride.

4. A composition as in claim 3 wherein the bituminous material is paving grade asphalt.

5. A composition as in claim 3 wherein the bituminous material is residual fuel oil.

6. A composition as in claim 3 wherein the bituminous material is an Edeleanu extract of petroleum distillate.

7. A composition as in claim 3 wherein the polyepoxide is a glycidyl polyether of a polyhydric phenol having a molecular weight between 200 and 900.

8. A composition as in claim 3 wherein the partial ester is an ester of an alkylene glycol and an adduct of a polyethylenically unsaturated fatty acid and maleic anhydride.

9. A composition as in claim 3 wherein the partial ester is an ester of ethylene glycol and an adduct of linoleic acid and maleic anhydride.

10. A composition as in claim 3 wherein the partial ester is an ester of butylene glycol and an adduct of linoleic acid and maleic anhydride.

11. A composition as in claim 3 wherein the partial ester is an ester of polyethylene glycol and an adduct of rosin acid and maleic anhydride.

12. A composition comprising (1) a liquid polyepoxy having more than one vic-epoxy group, (2) an asphalt, (3) a partial ester of a polyhydric alcohol and an adduct of an unsaturated long chain fatty acid and maleic anhydride, and (4) more than 50% by weight of (1), (2), and (3) above of inert particles.

13. A composition as in claim 12 wherein the amount of the liquid polyepoxy comprises 10% to 75% by weight of the mixture of polyepoxide and asphalt, the asphaltic material makes up from 75% to 90% of that mixture, and the partial ester makes up from 10% to 80% by weight based on the weight of the polyepoxide.

14. A process for preparing a bituminous material comprising mixing a polyepoxide having more than one vic-epoxy group, a bituminous material and a polycarboxylic acid comprising a partial ester of a polyhydroxy-containing compound of the group consisting of aliphatic and cycloaliphatic polyhydric alcohols and an adduct of an ethylenically unsaturated compound of the group consisting of ethylenically unsaturated aliphatic hydrocarbons, ethylenically unsaturated fatty acids and their alkyl esters, each member of said group containing at least 10 carbon atoms, and a butenedioic acid anhydride.

15. A process for preparing a composition useful in preparing roadways and walkways which comprises mixing a polyepoxide having more than one vic-epoxy group with a bituminous material, a partial ester of a polyhydroxy-containing compound of the group consisting of aliphatic and cycloaliphatic polyhydric alcohols and an adduct of an ethylenically unsaturated compound of the group consisting of ethylenically unsaturated aliphatic hydrocarbons, ethylenically unsaturated fatty acids and their alkyl esters, each member of said group containing at least 10 carbon atoms, and a butenedioic anhydride and then adding this to heated aggregate.

16. A process for preparing an improved surface for traffic areas which comprises mixing a liquid polyepoxide having more than one vic-epoxy group with an asphalt, a partial ester of a polyhydroxy-containing compound of the group consisting of aliphatic and cycloaliphatic polyhydric alcohols and an adduct of an ethylenically unsaturated compound of the group consisting of ethylenically unsaturated aliphatic hydrocarbons, ethylenically unsaturated fatty acids and their alkyl esters, each member of said group containing at least 10 carbon atoms, and maleic anhydride, and heated aggregate, mixing the components, spreading the mixture to the desired thickness, compacting and allowing to set.

17. A process for preparing a non-skid surface comprising applying to a surface a composition comprising a polyepoxide having more than one vic-epoxy group, an asphalt and a partial ester of a polyhydroxy-containing compound of the group consisting of aliphatic and cycloaliphatic polyhydric alcohols and an adduct of an ethylenically unsaturated compound of the group consisting of ethylenically unsaturated aliphatic hydrocarbons, ethylenically unsaturated fatty acids and their alkyl esters, each member of said group containing at least 10 carbon atoms, and maleic anhydride, spreading finely divided inert particles over the coating, compacting the particles and allowing the composition to set hard.

18. A process as in claim 17 wherein the surface to be coated is a cement concrete surface.

19. A process as in claim 17 wherein the surface to be coated is an asphaltic concrete surface.

20. A traffic surface coated with a layer of cured resinous material containing embedded aggregate particles, said resinous material before cure comprising a mixture of a liquid polyepoxide having more than one vic-epoxy group with an asphalt, a partial ester of a polyhydroxy-containing compound of the group consisting of aliphatic and cycloaliphatic polyhydric alcohols, and an adduct of an ethylenically unsaturated compound of the group consisting of ethylenically unsaturated aliphatic hydrocarbons, ethylenically unsaturated fatty acids and their alkyl esters, each member of said group containing at least 10 carbon atoms, and maleic anhydride.

References Cited in the file of this patent

UNITED STATES PATENTS

| | | |
|---|---|---|
| 2,858,323 | Smith | Oct. 28, 1958 |
| 2,895,389 | Nagin | July 21, 1959 |
| 2,906,720 | Simpson | Sept. 29, 1959 |

FOREIGN PATENTS

| | | |
|---|---|---|
| 802,099 | Great Britain | Oct. 1, 1958 |

OTHER REFERENCES

Modern Plastics, September 1954, p. 160.